(No Model.)

E. K. RIGHTER.
BALL RETAINER FOR ANTIFRICTION WHEEL BEARINGS.

No. 570,146. Patented Oct. 27, 1896.

WITNESSES:
M. A. Leyden
J. J. Laars.

INVENTOR:
Edmund K. Righter
By E. Laars
his ATTORNEY

UNITED STATES PATENT OFFICE.

EDMUND K. RIGHTER, OF JERSEY CITY, NEW JERSEY.

BALL-RETAINER FOR ANTIFRICTION WHEEL-BEARINGS.

SPECIFICATION forming part of Letters Patent No. 570,146, dated October 27, 1896.

Application filed December 31, 1895. Serial No. 573,898. (No model.)

*To all whom it may concern:*

Be it known that I, EDMUND K. RIGHTER, of Jersey City, in the county of Hudson, in the State of New Jersey, have invented new and useful Improvements in Ball-Retainers for Antifriction Wheel-Bearings, of which the following, taken in connection with the accompanying drawings, is a full, clear, and exact description.

This invention has special reference to the class of antifriction wheel-hubs in which the ball-bearing cone is disposed with its small end outward and the ball-bearing cup encircles with its small peripheral edge the outer end of the cone.

The object of the invention is to provide simpler, cheaper, and more convenient devices for retaining the balls on the cone independently of the cup, and which ball-retaining devices shall be capable of being more readily applied to and removed from the cone when required; and to that end the invention consists in the combination, in a ball-bearing, of the cone provided with a circumferential groove adjacent to the ball-race and a cup-shaped annular spring-plate slitted transversely to render it expansible and sustained in the aforesaid groove by the automatic contraction of said plate, as hereinafter more fully described.

Figure 1:
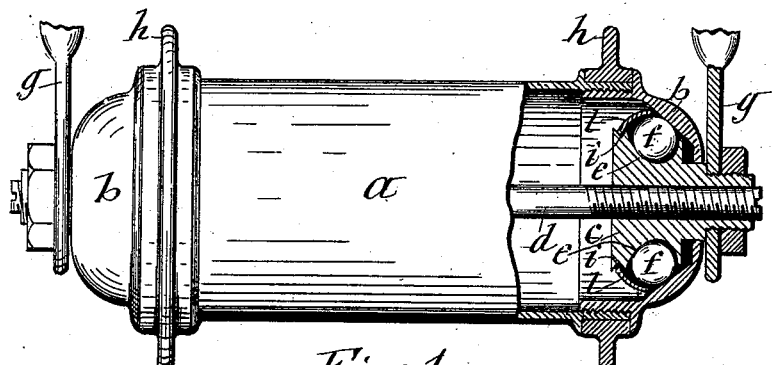
Figure 3:
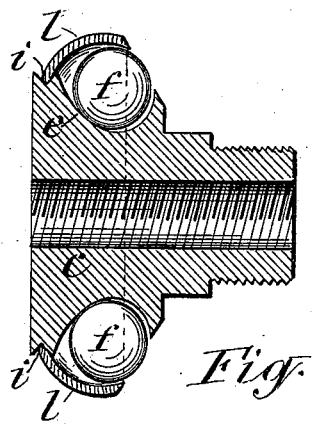
Figure 2:
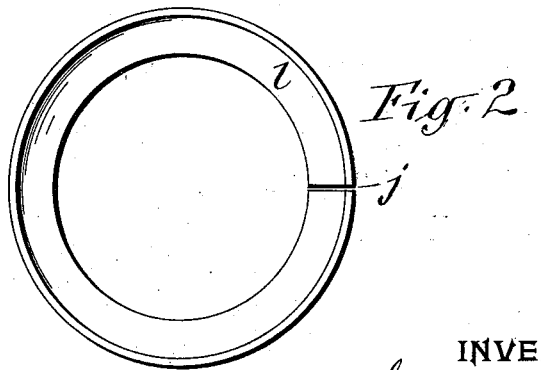

In the accompanying drawings, Figure 1 is partly a side view and partly a longitudinal section of a wheel-hub embodying my invention. Fig. 2 is a detached plan view of my preferred form of the ball-retainer, and Fig. 3 is an enlarged sectional view of the cone and balls removed from the hub.

$a$ represents the tubular hub, to each end of which is detachably secured a cup $b$, which constitutes one of the bearing members.

$c$ denotes the so-called "cone," which is provided with a screw-threaded axial channel by which it is detachably mounted on the screw-threaded end portion of the axle $d$. Said cone is formed with the usual ball-race $e$ for the interposed balls $ff$, which form the antifriction-bearings for the hub.

$g$ represents the end of one of the forks by which the frame of the bicycle is supported on the wheels, and $h\ h$ are the flanges to which the inner ends of the wire spokes of the wheel are attached.

The cone $c$ is disposed with its smaller end outward from the hub $a$. Said end is encircled by the cup $b$, as shown in Fig. 1 of the drawings.

In order to retain the balls $ff$ on the cone independently of the cup $b$ and allow said balls to be removed from the hub simultaneously with the removal of the cone, I provide the inner end of the cone with a rim $l$, which is cup-shaped or concavo-convex in cross-section and disposed with its concave side over the ball-race $e$ on the cone.

When it is desired to remove the cone from the hub, the latter is placed in an upright position. Then the fork $g$ and its retaining-nut on the end of the axle $d$ are removed from the cone and the cup $b$ removed from the body of the hub, and then the cone $c$ is unscrewed from the axle, and in this latter operation the rim $l$ serves to retain the balls $ff$ on the cone. By making the said rim of sufficient depth to contract the space between the free edge thereof and front edge of the ball-race $e$ to a width smaller than the diameter of the ball the egress of the balls from the raceway in the cone is choked, so that the cone may be removed from the hub while in a horizontal position without allowing the balls to fall out of the ball-race. In order to allow the balls to be removed from the cone after the latter has been removed from the hub, I make the rim $l$ detachable from the cone and preferably form said rim of a suitable sheet-metal ring, which I render expansible and contractible by splitting it transversely, as shown at $j$ in Fig. 2 of the drawings. This ring I detachably secure to the inner end of the cone $c$ by providing the edge of the latter with a circumferential groove $i$, into which the said ring is seated by the smaller circumferential edge thereof. I preferably form said ring of thin spring metal and of a diameter to allow it to be sprung into the groove and cause it to be held therein by the resilience of the ring.

What I claim as my invention is—

In a ball-bearing, the combination of the cone $c$ provided with the circumferential groove $i$ adjacent to the ball-race, and the cup-shaped annular spring-plate $l$ slitted transversely to render it expansible and seated in the aforesaid groove by automatic contraction of said plate as set forth.

In testimony whereof I have hereunto signed my name this 23d day of November, 1895.

EDMUND K. RIGHTER. [L. S.]

Witnesses:
 J. R. FENDER,
 FRANK T. KENT.